United States Patent
Metzger et al.

(10) Patent No.: US 11,914,359 B2
(45) Date of Patent: Feb. 27, 2024

(54) METHOD AND DEVICE FOR PLANNING MAINTENANCE ON AT LEAST ONE MACHINE

(71) Applicant: SCHULER PRESSEN GMBH, Goeppingen (DE)

(72) Inventors: Alexander Metzger, Eislingen (DE); Stefanie Apprich, Stuttgart (DE)

(73) Assignee: SCHULER PRESSEN GMBH, Goeppingen (DE)

( * ) Notice: Subject to any disclaimer, the term of this patent is extended or adjusted under 35 U.S.C. 154(b) by 31 days.

(21) Appl. No.: 17/588,422

(22) Filed: Jan. 31, 2022

(65) Prior Publication Data
US 2022/0155775 A1    May 19, 2022

Related U.S. Application Data (63) Continuation-in-part of application No. PCT/EP2020/070874, filed on Jul. 23, 2020.

(30) Foreign Application Priority Data

Aug. 1, 2019   (DE) .................... 10 2019 120 864.5

(51) Int. Cl.
G05B 23/02    (2006.01)
G05B 13/04    (2006.01)

(52) U.S. Cl.
CPC ....... *G05B 23/0283* (2013.01); *G05B 13/048* (2013.01); *G05B 23/0224* (2013.01); *G05B 23/0243* (2013.01); *G05B 23/0262* (2013.01)

(58) Field of Classification Search
CPC .............. G05B 23/0283; G05B 13/048; G05B 2219/25428; G05B 2219/32233;
(Continued)

(56) References Cited

U.S. PATENT DOCUMENTS 6,915,237 B2    7/2005    Hashemian
10,114,367 B2   10/2018   Bates et al.
(Continued)

FOREIGN PATENT DOCUMENTS

DE    10 2012 100 469 A1    7/2012
DE    10 2019 120 864 B3    12/2020

OTHER PUBLICATIONS

US 2008/0133178 A1, Published: Jun. 5, 2008; Brian Dara Byrne, et al.
(Continued)

*Primary Examiner* — Son T Le
*Assistant Examiner* — Matthew W. Baca
(74) *Attorney, Agent, or Firm* — Ronald S. Lombard (57) ABSTRACT

A device and a method for planning of maintenance work on a machine. Based on sensor data S, input data E are generated. The input data E are compared with model sensor data of different model data pattern and are checked regarding conformity. Each model data pattern is assigned a maintenance model in the model database. If a conformity of input data E with model sensor data M of a model data pattern has been determined, the assigned maintenance model can be selected for a maintenance of the machine. The maintenance model comprises at least one maintenance step and the resource required for it to be carried out. Subsequently, the availability of the required resource is checked and the resource is requested, if available. By such a device or method, a predicted maintenance can be performed based on empirical knowledge contained in the maintenance models of model database.

11 Claims, 2 Drawing Sheets

(58) Field of Classification Search
CPC ........... G05B 2219/32234; G05B 2219/24001; G05B 2219/24019; G06Q 10/06; G06Q 10/0631; G06Q 10/06311; G06Q 10/063114; G06Q 10/06312; G06Q 10/06314; G06Q 10/06315; G06Q 10/20
See application file for complete search history.

(56) References Cited

U.S. PATENT DOCUMENTS

| | | | |
|---|---|---|---|
| 2004/0039499 A1* | 2/2004 | Felke | G06F 16/284 |
| | | | 701/29.3 |
| 2004/0254764 A1 | 12/2004 | Wetzer | |
| 2007/0067678 A1 | 3/2007 | Hosek | |
| 2012/0304008 A1 | 11/2012 | Hackstein et al. | |
| 2015/0278690 A1* | 10/2015 | Bialk | G06Q 10/06 |
| | | | 702/56 |
| 2017/0364818 A1 | 12/2017 | Wu et al. | |
| 2018/0121887 A1* | 5/2018 | Pinsonnault | G06Q 50/04 |
| 2018/0189748 A1 | 7/2018 | Anderson et al. | |
| 2020/0396912 A1* | 12/2020 | Stouffer | E04H 12/344 |

OTHER PUBLICATIONS

"The Standardization Roadmap of Predictive Maintenance for Sino-German Industrie 4.0/Intelligent Manufacturing" BMWi, Berlin, Apr. 2018, 30 pages.

E2: Merkmalsanalyse, Sep. 17, 2021, 2 pages, cited in $2^{nd}$ German Office Action.

International Search Report for the corresponding international application No. PCT/EP2020/070874, dated Sep. 2, 2020 in the German language (3 pages).

English translation of the International Search Report for the corresponding international application No. PCT/EP2020/070874, dated Sep. 2, 2020 (3 pages).

$1^{st}$ German Office Action, dated Apr. 14, 2020, for corresponding German patent application No. 10 2019 120 864.5 for which the present application claims priority, in the German language, (5 pages) with an attached Google English Translation of the substantive portion of the same (6 pages).

2nd German Office Action, dated Dec. 14, 2021, for corresponding German patent application No. 10 2019 120 864.5 for which the present application claims priority, in the German language, (2 pages) with an attached Google English Translation of the substantive portion of the same (2 pages).

* cited by examiner

Fig. 3

METHOD AND DEVICE FOR PLANNING MAINTENANCE ON AT LEAST ONE MACHINE

CROSS-REFERENCE TO RELATED APPLICATION

This is a continuation-in-part application of pending international patent application PCT/EP2020/070874 filed Jul. 23, 2020 and claiming the priority of German Patent Application No. 10 2019 120 864.5 filed Aug. 1, 2019. The said international patent application PCT/EP2020/070874 and said German Patent Application No. 10 2019 120 864.5 are both incorporated herein by reference in their entireties as though fully set forth.

BACKGROUND OF THE INVENTION

The invention refers to a device and a method for planning of maintenance on at least one machine. The machine is in particular a forming machine with which a workpiece is processed in a forming manner, e.g. a press.

Planning and efficiently and timely carrying out maintenance work on machines is still a challenge. On one hand unnecessary and unnecessary long maintenance work and downtime of a machine related therewith should be avoided, on the other hand maintenance work has to be carried out regularly and in time in order to avoid damages on a machine. In the prior art a multiplicity of approaches exist for monitoring machines or planning maintenance work.

U.S. Pat. No. 10,114,367 B2 describes a server platform for an operation and maintenance system. The server platform defines an interface to diverse data sources in order to map different data types on a standard type and thus to allow a data exchange or a standardized data evaluation.

WO 2011/034805 A1 discloses a device and a method for error diagnosis of a machine. It is considered as a problem that large volumes of data are required in order that a learning system (e.g. neuronal network) learns to distinguish allowed and unallowed operating conditions. In order to provide an error diagnosis system that also manages to operate without large learning volumes, manual rules are set that describe the normal operating condition and the error operating condition of the machine. By using a probability distribution over the feature condition ranges of a measured feature vector an artificial feature vector is created that either characterizes the normal operating condition or the error operating condition.

An automatic condition monitoring and anomaly detection for a predictive maintenance is apparent from EP 3 258 426 A1. A regression model is trained by using historical data of a multiplicity of sensors. A probability for a deviation between a calculated difference between the actually measured sensor value and a predicted sensor value is determined and compared with a threshold. If the probability for the difference between the predicted sensor value and the measured sensor value is sufficiently large, a normal condition is concluded, otherwise an anomaly condition is identified.

U.S. Pat. No. 6,915,237 B2 refers to an integrated system for verification of the performance and operability of instruments and methods. The integrated system provides a possibility for automatic calibration and monitoring of the calibration via a network access (online) or on site for instruments and methods that require calibration.

The system for condition monitoring and error diagnosis according to EP 2 998 894 A1 is about creating hypotheses about a condition of one or multiple components based on historic values of variables and to determine the condition of the one or more components based on these hypotheses.

Starting from the prior art it is an object of the present invention to provide an improved planning of maintenance work on at least one machine. This object is solved by means of a device and a method having the features of the claims.

SUMMARY OF THE INVENTION

The invention refers to a device 10 and a method 20 for planning of maintenance work on a machine 11. Based on sensor data S, input data E are generated. The input data E are compared with model sensor data of different model data pattern 26 and are checked with regard to conformity. Each model data pattern 26 is assigned a maintenance model 22 in the model database 17. If a conformity of input data E with model sensor data M of a model data pattern 26 has been determined, the assigned maintenance model 22 can be selected for a maintenance of the machine 11. The maintenance model 22 comprises at least one maintenance step 24 and the resource 25 required for it to be carried out. Subsequently, the availability of the required resource 25 is checked and the resource 25 is requested, if available. By means of such a device 10 or such a method 20, a predicted maintenance can be carried out based on empirical knowledge contained in the maintenance models 22 of model database 17. The maintenance models 22 can be generated by means of machine learning.

The device according to the invention has an input module, a model module, a resource module, a planning module as well as an interface module. The planning module is communicatively connected with all other modules and thus forms a central node so-to-speak. Each module can be realized in a separate component group. It is also possible to realize multiple modules as software modules in a common component or a common component group. Each module can be a hardware and/or software module.

The input module is configured for receiving sensor data of the machine. It is further configured to provide input data for at least one other module, particularly the planning module, based on the sensor data. For example, the input data can be a subset of the received sensor data and/or preprocessed sensor data. For example in addition or as an alternative, the input module can be configured to check the sensor data for errors and not to provide erroneous sensor data as input data. For this purpose a specific sensor value of sensor data can be compared with an allowable value range, for example. In addition, the control process of the machine is known to the input module preferably and can be considered during selection of sensor databased on which input data shall be provided. Thus, depending on the actual condition of the machine, a selection of relevant sensor data can be carried out that can be provided in form of input data.

The model module has access on a model database. Maintenance models for maintenance work to be carried out are stored in the model database. The maintenance models can be created by machine learning and/or can be created manually. The model module is particularly configured to automatically learn based on AI algorithms or algorithms for machine learning. For example, the model module can comprise a neuronal network for machine learning. In an embodiment the model module can be configured to carry out machine learning in the form of the so-called deep learning.

Each maintenance model contains a maintenance progress with at least one maintenance step. In addition, each maintenance step in the maintenance model is assigned a resource required for carrying out this maintenance step. The resource can be at least one person that has the required abilities or qualification for carrying out the respective maintenance step and/or at least one apparatus and/or instrument and/or device that is needed for carrying out the maintenance step. For example, it can be necessary to use specific tools, measurement apparatus, analysis devices or the like for carrying out of a maintenance step. A resource can thus also be an arbitrary combination of at least one person and at least one apparatus and/or instrument and/or device.

In addition, each maintenance model is assigned a model data pattern in the model database. Thereby each maintenance model is correlated with at least one model data pattern. It is possible to correlate multiple model data patterns with one maintenance model. Preferably each model data pattern is correlated only with exactly one maintenance model. Each model data pattern contains model sensor data. The model sensor data form a comparison data set for comparison with the input data. The model sensor data can comprise an individual isolated model sensor value respectively for comparison with an actual input value from the input data respectively, for example.

The input data and the model sensor data of each model data pattern can also contain data that describe a monitoring period for a specific sensor value. For one or multiple input values of the input data the model sensor data can comprise multiple assigned model sensor values for comparison respectively that describe a time-dependent progress over the monitoring period, for example. For example a temperature progress measured by means of a temperature sensor contained in the input data can be compared with a temperature progress contained in the model data pattern.

The resource module has access to a resource database. In the resource database resources and their availability period are stored.

The planning module and/or the model module is configured to carry out a comparison between the input data and the model sensor data in the model patterns. During this comparison the identity or similarity between the input data and the model sensor data in the model data pattern is checked. If the input data are identical or sufficiently similar to the model sensor data of a model data pattern, a consistency is determined. For this comparison AI algorithms for pattern recognition and/or pattern analysis can be used. In case of determined consistency, the assigned maintenance model is selected and provided in the planning module.

The planning module and/or resource module is configured to check the availability of the resource indicated in the selected maintenance model. If the resource is available, the resource availability is confirmed. In this case the maintenance progress indicated in the selected maintenance model can be in fact carried out, because a resource necessary for this is available.

During the check of an availability of a resource the following conditions can be checked:
a maximum maintenance duration between the start of the first maintenance step and the end of the last maintenance step has to be met; and/or
the start and/or the end of the maintenance has to be done in a predefined period.

By means of these conditions it can be guaranteed that the maintenance progress does not result in very long machine downtimes and on the other hand is in fact started or terminated in a designated time window in order to avoid damages or excessive wear due to a delayed maintenance.

According to the invention, the planning module is in addition configured to control an interface module. The maintenance progress with the at least one maintenance step is output to the required resource via the interface module. For example, a respectively qualified person can be given a maintenance order for one or multiple maintenance steps. Alternatively or additionally, an instrument or apparatus or device that is required for one or multiple maintenance steps can be reserved in a stock system or logistics system, such that it is available for the concerned maintenance step.

For example, a smartphone, tablet or another preferably mobile device can serve as interface module for a person on which maintenance orders can be output or displayed to the person. Preferably the interface module is also configured that a person and/or a system can enter input data, e.g. acknowledge the completion of a maintenance step.

According to the invention, a device is provided that automatically executes all of the aspects of maintenance planning. On the basis of input data required maintenance steps can be selected and the required resource can be planned. In the model database maintenance models are stored that are based on manually input data or on machine learning and thus represent empirical knowledge. Based on the empirical knowledge, a predictive maintenance can be carried out. In doing so, excessive wear and defects of a machine and downtimes related therewith can be reduced. Due to empirical knowledge in the maintenance models, also unnecessary short intervals for specific maintenance work can be avoided. The effort for the maintenance and the downtimes of the machine are kept low.

Preferably, the interface module is configured to change the maintenance progress and/or at least one of the contained maintenance steps output via the interface module in response to an input or request of a resource. In doing so, it is possible to only authorize specific persons for such a modification. For example, a person in charge of a maintenance step can modify the maintenance step prior to the execution of the maintenance step or after the execution of the maintenance step in order to adapt the maintenance step to the specific requirements of the machine that result, for example, from an inspection of the machine. The modified maintenance progress can be submitted to the model module. For example, the model module can be configured to modify the concerned maintenance model or to store a new maintenance model in the model database.

It is also advantageous, if the planning module and/or the model module is configured to link the input data by means of a predefined correlation and to calculate an indicator value therefrom. The predefined correlation can link an arbitrary number of input data in any arbitrary manner with one another. The indicator value can subsequently be used for carrying out the comparison between the input data and the model sensor data of a model data pattern. For example, the indicator value of the input data can be compared with a model indicator value assigned to a maintenance model. The model indicator value can be stored in the maintenance model or can be calculated by the planning module and/or the model module based on the same correlation that has been used for the determination of the indicator value.

Preferably a conformity between the input data and the model sensor data of a model data pattern of a maintenance model is determined, if the deviation between the indicator value and the model indicator value is less than a predefined maximum deviation. For example, a sufficient similarity can exist, if the indicator value and the model indicator value or their amounts deviate from each other at most about 20%.

If no model data pattern has been found conforming to the input data, it can be concluded therefrom that no maintenance work is required at present. If additional information or findings are present that signalize the requirement of a maintenance, it is advantageous, that the planning module is configured to request a maintenance service, if no model data pattern has been found matching the input data. In this case, the actual condition of the machine characterized by the input data cannot be assigned to a maintenance model. Additional information or findings that signalize the requirement of a maintenance can be, for example: the end of a period after the previous maintenance and/or an input value of the input data that is outside of an allowable value range and/or a recognized failure of a sensor or another component of the machine, etc.

In addition or as an alternative, a planning module can be configured to request a maintenance service, if the resource required for the selected maintenance model is not available.

If the request of a maintenance service is present, a respective qualified person of the maintenance service decides on the further procedure.

It is preferred, if the planning module is configured to search for another conforming model data pattern, in case the resource required for the maintenance progress of a selected maintenance model is not available. Due to lack of availability, the maintenance progress cannot be executed as provided in the selected maintenance model. In this case the planning module can initiate a check whether a further maintenance model with an alternative maintenance progress exists. For this the input data can be compared with regard to identity or similarity with the model sensor data of a model data pattern, as described above.

Preferably during comparison of the input data with the model sensor data a priority order for identical or similar model data pattern and the assigned maintenance models can be generated. In the priority order the maintenance model is in the first position (highest priority) that comprises the greatest similarity between the model sensor data and the input data. The further maintenance models can adjoin in an order with decreasing similarity between the model sensor data and the input data. For example, for this purpose the deviation between the indicator value and the model indicator value can be used. Already during the first search for a matching maintenance model, multiple maintenance models can be selected in a priority order in this manner. If then the resource of the maintenance model with the highest priority is not available, the availability of the resource of the maintenance model with the second highest priority can be checked subsequently, etc., until a maintenance model has been found, the resource of which is available. If no matching maintenance model can be found, the maintenance service can be requested, for example, as it has been explained above.

The input module and/or the planning module can be additionally configured to compare the sensor data or the input data with at least one predefined criteria and to initiate a measure depending on the comparison result. For example, different measures can be initiated depending on the difference between sensor data and the predefined criteria. For example, depending on the comparison, multiple conditions of the machine can be distinguished, for example: normal operating condition, an operating condition requiring maintenance or repair and a critical operating condition that requires emergency stop of the machine. The comparison result can be provided as additional information to the planning module, if the comparison with the criteria is executed in the input module. The check and launch of measures by means of the input module can be made in addition to the above-described predictive maintenance.

If the machine requires repair or restoration, the input module can be configured to output a respective warning, if the sensor data and/or the input data fulfil a warning criteria. The input module can be configured to cause an emergency stop of the machine if the sensor data and/or the input data fulfil an emergency stop criteria.

BRIEF DESCRIPTION OF THE DRAWINGS

Advantageous embodiments of the invention are disclosed in the depending claims, the description and the drawings. The drawings show:

DETAILED DESCRIPTION OF THE INVENTION

Figure 1:
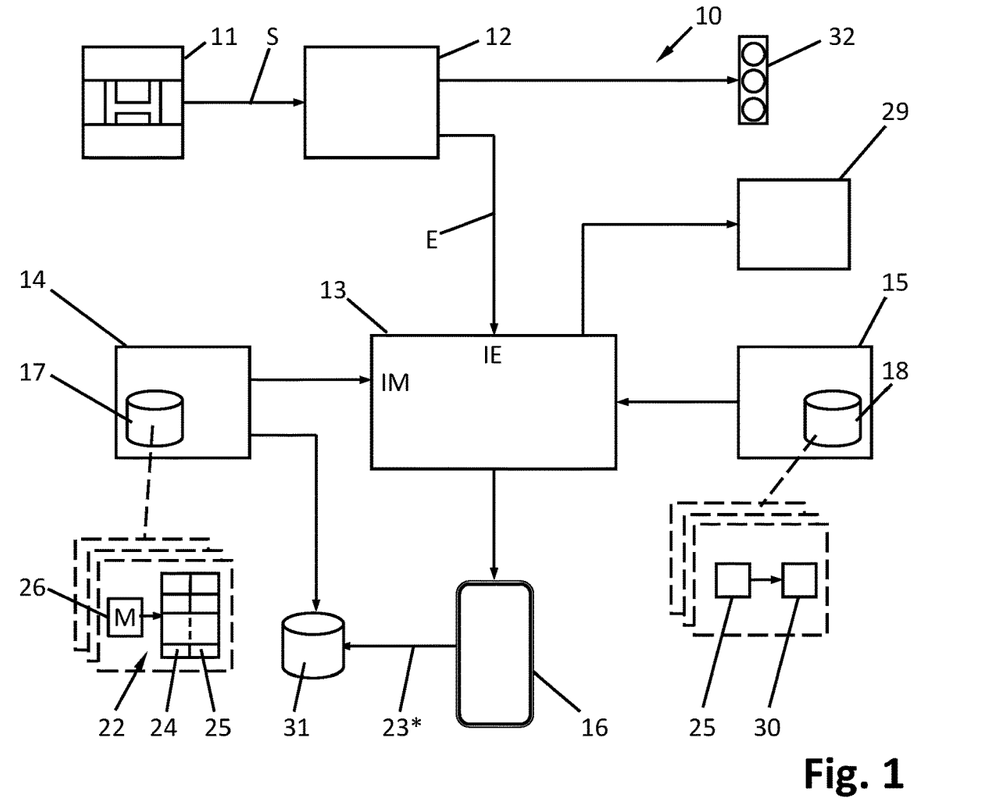
FIG. 1 a block diagram of an embodiment of a device for planning of maintenance work on at least one machine, FIG. 2 a schematic exemplary illustration of a maintenance progress that can be output via an interface module of the device according to FIG. 1 and FIG. 3 a flow diagram of an embodiment of a method for planning of maintenance work on a machine that can be executed by means of the device according to FIG. 1.

An embodiment of a device 10 for planning of maintenance work on a machine 11 is illustrated in FIG. 1. In the following, device 10 and the manner of operation is explained with reference to FIGS. 1-3.

The device 10 comprises an input module 12, a planning module 13, a model module 14, a resource module 15 as well as an interface module 16. The planning module 13 is communicatively connected with the other modules 12, 14, 15, 16. The model module 14 has access to a model database 17. The resource module 15 has access to a resource database 18.

The machine 11 comprises multiple not illustrated sensors that create a sensor signal respectively, wherein the sensor signals commonly represent sensor data S that are submitted from the machine 11 to the input module 12. The input module 12 is provided and configured to provide input data E based on the received sensor data S and particularly to submit input data E to the planning module 13. The input data E can be, e.g. a subset of the received sensor data S. In addition, the input module 12 can be configured to check the received sensor data S for erroneous data and to not provide them in the form of input data E. For example, each sensor value of sensor data S can be checked whether it is inside an allowable value range. The input module 12 can also carry out plausibility checks by comparison of one or multiple of the sensor values of sensor data S in order to recognize and suppress erroneous sensor values. It is also possible to compare an actual sensor value with a temporarily preceding sensor value of the same sensor such that sudden amount differences in the signal of a sensor can be determined and suppressed as being erroneous after checking if applicable.

The provided input data E characterize the condition of the machine 11. For example, such sensor values can be selected from the sensor data S with regard to their relevance, depending on the actual condition of the control of the machine 11 that may be known in the input module 12. Due to the reduction of the data volume of the input data E compared with sensor data S, the band width for data transmission between the input module 12 and the planning module 13 can be reduced.

Figure 3:
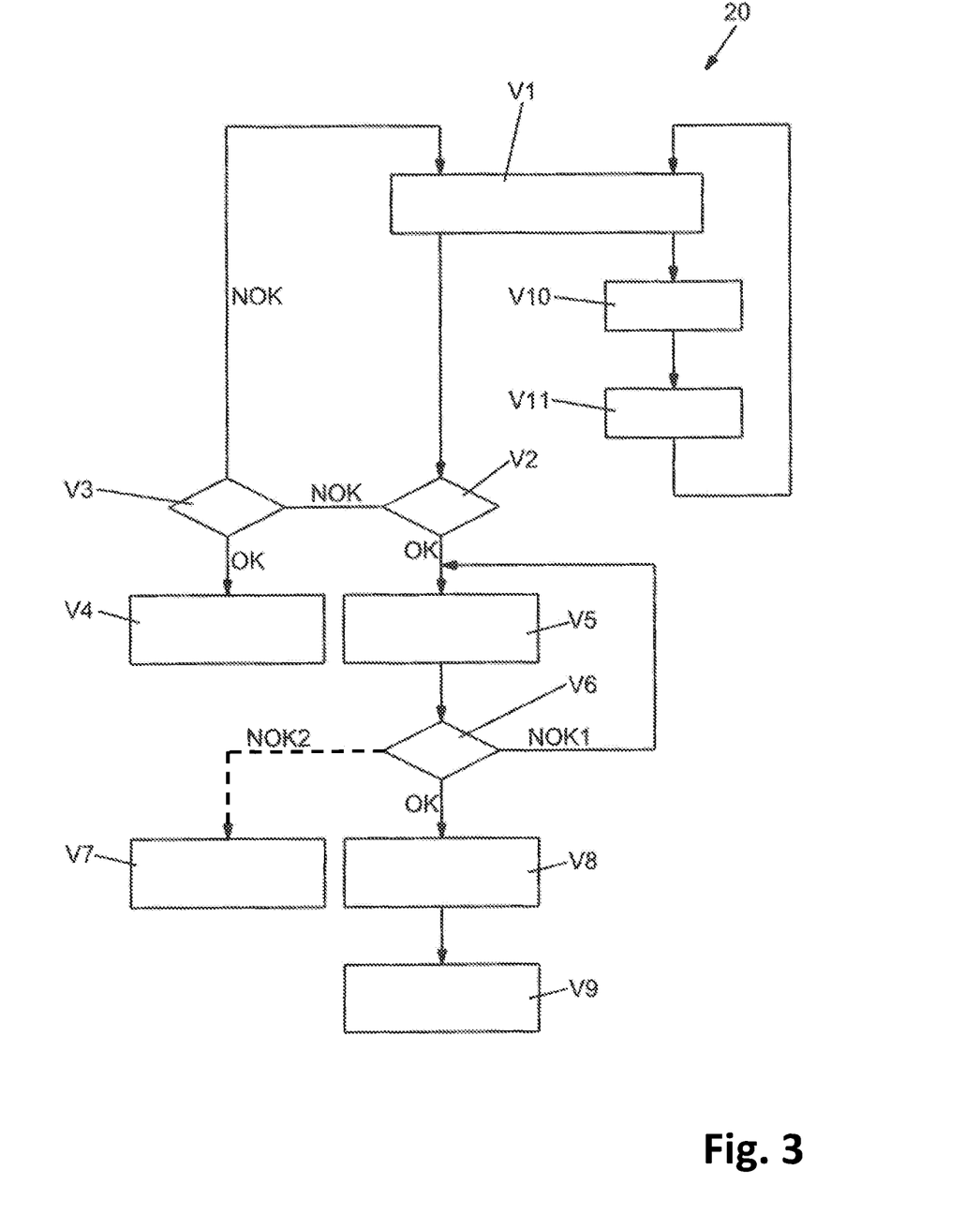

The receipt of sensor data S and the provision of input data E by the input module 12 is carried out in a first method step V1 (FIG. 3).

Multiple maintenance models 22 are stored in the model database 17. Each maintenance model 22 obtains the maintenance progress 23. The maintenance progress 23 for maintenance of the machine 11 comprises at least one maintenance step 24 as well as an indication with regard to a resource 25 that is required in order to be able to carry out the respective maintenance step 24. For example, a resource can be a person qualified for carrying out the maintenance step. In addition or as an alternative, the resource 25 can be an apparatus or an instrument that is required for carrying out the maintenance step 24, e.g. a measurement apparatus, an analysis instrument, a tool, etc.

In addition, each maintenance model 22 is linked with a model data pattern 26 comprising model sensor data M in the model database 17. The model sensor data M correspond at least to a subset of the sensor signals or sensor values contained in the sensor data S. The model sensor data M characterize a specific maintenance requiring condition of the machine 11, wherein the maintenance progress to be executed having the at least one maintenance step 24 is described by the maintenance model 22 that is linked with the model data pattern 26. The model data pattern 26 does not contain model sensor data M that cannot be contained in the sensor data S and thus in the input data E.

The model database 17 can be trained by manual input of one or multiple maintenance models 22 and model data patterns 26. In addition or as an alternative, the model module 14 can be configured for machine learning and can, for example, learn continuously based on algorithms for machine learning, such as neuronal networks, during the operation of the machine 11. If, for example, maintenance work is carried out, the input data E that have initiated specific maintenance work can be stored as model sensor data M in a model data pattern 26 and the maintenance work that has been carried out can be stored in the form of at least one maintenance step 24 and the required resource 25 as maintenance model 22 linked therewith in the model database 17. In this manner a model module 14 can be trained or can learn automatically. It is also possible to take over maintenance models 22 and model data pattern 26 from other identical or similar machines and to store them in the model database 17.

The model module 14 or preferably the planning module 13 is configured to carry out a comparison between the input data E and the model sensor data M of the model data pattern 26 in order to find a conformity (second method step V2 in FIG. 3). The input data E and the model sensor data M are in conformity, if they are identical or similar. During the check of similarity, algorithms of pattern recognition can be used.

In the embodiment the planning module 13 is configured to determine an indicator value IE on the basis of the actual input data E based on a predefined correlation. The correlation can be any arbitrary mathematical function. Each correlation can consider all of the sensor data S. If a particular sensor value is not contained in the input data E, this value can be set to a standard value, for example zero.

On the basis of the same predefined correlation, the model sensor data contained in a model data pattern 26 can be correlated with each other and a model indicator value IM can be calculated therefrom. The indicator value IE of the input data E and the model indicator value IM of a model data pattern 26 can be compared with one another in the planning module 13. Thereby a deviation between the indicator value IE and the model indicator value IM can be determined and compared with a threshold. If this deviation is sufficiently small, for example at most 20%, a similarity between the input data E and the model sensor data M can be recognized. Otherwise the input data E are dissimilar to the model sensor data M of a model data pattern 26.

During this comparison a predefined number or all of the maintenance models 22 can be selected that are linked with a model data pattern 26 that contains model sensor data M that coincide (identity or similarity) with the input data E. The maintenance models 22 found in this manner can then be brought in a priority order. The maintenance model 22 that is linked with a model data pattern 26, the model sensor data M of which have the greatest similarity or are identical with the input data E is ranked in first place in the priority order. The other found maintenance models 22 adjoin with decreasing similarity of the assigned model data pattern 26. The possibility to bring multiple maintenance models 22, already identified as being similar, in a priority order is an option and also only the maintenance model 22 can be selected in which the conformity of the assigned model data pattern 26 with the input data E is the greatest.

Should no maintenance model 22 be identified, the model data pattern 26 of which comprises sufficient similarity to the input data E (branch NOK from second method step V2 in FIG. 3), the planning module 13 can be configured to check whether information or findings are present indicating that a maintenance is required (third method step V3 in FIG. 3). Such information or findings that signalize the requirement of a maintenance can be, for example: The end of a period since the last maintenance and/or an input value of the input data that is outside of an allowable value range and/or a determined failure of a sensor or another component of the machine, etc. In this case (branch OK from third method step V3 in FIG. 3) the planning module 13 can request maintenance service in a fourth method step V4. For example, a staff member of the maintenance service can then decide what maintenance the machine 11 requires.

If no information or findings are present that signalize the requirement of a maintenance (branch NOK from third method step V3 in FIG. 3), machine 11 does not require a maintenance at present.

As explained above, a single maintenance model 22 or also a priority order of multiple maintenance models 22 is generated, a model indicator value IM of which sufficiently corresponds with the indicator value IE of the input data E and the single maintenance model 22 or the maintenance model 22 with the highest priority is selected (fifth method step V5 in FIG. 3). Subsequently, the planning module 13 checks the availability of resource 25 required for carrying out the at least one method step 24 by means of the resource module 15 (sixth method step V6 in FIG. 3). For this, availability periods 30 are assigned to each resource 25 in the resource database 18. The resource module 15 informs the planning module 13 whether the requested resource 25 is available for a planned maintenance step 24. The planning module 13 considers during check of the availability the following requirements:

1. The at least one maintenance step 24 of the maintenance progress 23 must be terminated to a predefined end time or end date; and
2. The maintenance period between the start of the first maintenance step and the termination of the last maintenance step 24 must not exceed a maximum maintenance duration.

If both requirements are fulfilled, the resource 25 is available for carrying out the maintenance progress 23

(branch OK from the sixth method step V6 in FIG. 3). If one of the indicated requirements is not fulfilled, the resource 25 is not available for the planned maintenance progress 23. Each resource 25 can be a person and/or an apparatus or instrument.

Should the resource 25 not be available for the planned maintenance progress, it can be searched for a further maintenance model 22, the model data pattern 26 of which are similar to the input data E (branch NOK1 from the sixth method step V6 in FIG. 3). If already in the preceding step a priority order of multiple maintenance models 22 has been defined, the next maintenance model in the priority list is selected and its resource 25 is checked for availability.

Should no resource 25 be available for any matching maintenance model 22 (branch NOK2 from the sixth method step V6 in FIG. 3), the planning module 13 can inform maintenance service 29 (seventh method step V7 in FIG. 3) such that a qualified staff member of the maintenance service 29 can decide upon the further procedure.

If the resource 25 of a selected maintenance model 22 is available (branch OK from the sixth method step V6 in FIG. 3), the planning module 13 controls the interface module 16 and outputs the maintenance progress via the interface module 16 to the resource 25 (eighth method step V8 in FIG. 3).

Figure 2:
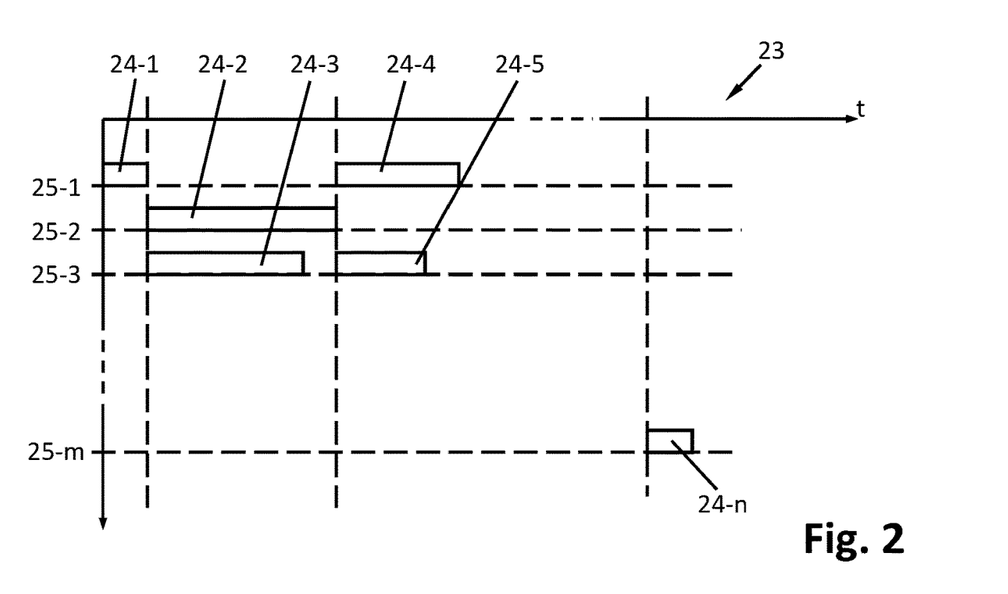

A maintenance progress 23 is schematically illustrated in FIG. 2 by way of example. A resource 25-1 to 25-m is assigned to each of the illustrated maintenance steps 24-1 to 24-n required therefore. In the illustrated example a first maintenance step 24-1 is carried out by means of a first resource 25-1. After termination of this first maintenance step 24-1 a second resource 24-2 or a third resource 25-3 is required for a subsequent second maintenance step 24-2 as well as a third maintenance step 24-3. As illustrated, a second maintenance step 24-2 and the third maintenance step 24-3 can be carried out concurrently. Only upon termination of the second maintenance step 24-2, a fourth maintenance step 24-4 and a fifth maintenance step 24-5 can be carried out by means of the first resource 25-1 or the third resource 25-3. The maintenance progress 23 is terminated, if the last maintenance step 24-n has been carried out by means of the assigned resource (here: resource 25-m). The number of resources 25 and the number of maintenance steps 24 as well as the time-dependent sequence and duration depend on the type of the machine 11 and the maintenance to be executed and can vary arbitrarily.

For example, the interface module 16 can comprise at least one mobile device, such as a tablet, PC or smartphone. For example, by means of such a mobile device a person can be informed about the maintenance steps 24 to be executed. If the required resource is an instrument or apparatus, the interface module 16 can reserve the instrument or apparatus in a logistics system or inventory management system in the respective period for the maintenance work to be executed.

After termination of a maintenance step the resource, e.g. the respective service staff member, acknowledges the action that has been carried out (ninth method step V9 in FIG. 3). It is also possible that authorized service staff members modify one of the maintenance steps 24 or the maintenance progress 23 either prior to the execution of the maintenance work or after their termination. The maintenance progress 23* modified or varied in this manner can be input via the interface module 16 and can be submitted to a buffer 31 or alternatively directly to the model module 14 (FIG. 1). In the embodiment the model module 14 has access to the buffer 31. Based on the modified maintenance progress 23*, either the selected maintenance model 22 can be adapted or else a new maintenance model 22 can be generated.

In the embodiment the input module 12 is in addition configured to compare the sensor data S and/or the input data E with at least one predefined criteria (tenth method step V10 in FIG. 3). Depending on the check whether the at least one criteria is fulfilled, the measure is immediately initiated, e.g. the check result is output (eleventh method step V11 in FIG. 3).

According to the example, a check is carried out whether a warning criteria or an emergency stop criteria is fulfilled. If the sensor data S and/or the input data E fulfill neither the warning criteria nor the emergency stop criteria, a condition display 32 is controlled in a manner such that normal operation is signalized. For example, the condition display 32 can contain a traffic light indication such that the traffic light is set to green.

In case the sensor data S and/or the input data E fulfill a warning criteria, a warning is output by means of the condition display 32, e.g. the traffic light can be set to yellow. If the sensor data S and/or the input data E fulfill an emergency stop criteria, an emergency stop of the machine 11 is caused. For example, a manually triggered emergency stop can be requested via the condition display 32. As an alternative or in addition to the output of the emergency stop via the condition display 32, the emergency stop can be initiated automatically. For requesting an emergency stop or for signalizing that an emergency stop has been executed, the traffic light can be set to red, for example.

The immediate measure loop of the tenth and eleventh method step V10, V11 refers to short-term events that require an immediate measure, i.e. within a period of some seconds to some hours, for example 12 hours. On the contrary, a mid-term to long-term maintenance planning is carried out by means of the planning module 13 in cooperation with the other modules 14, 15, 16 that refers to a time period until the initiation of a maintenance of multiple days up to multiple months. The time horizon for the immediate measure loop and the progress of the maintenance planning parallel to this are very different.

The invention refers to a device 10 and a method 20 for planning of maintenance work on a machine 11. Based on sensor data S, input data E are generated. The input data E are compared with model sensor data of different model data pattern 26 and are checked with regard to conformity. Each model data pattern 26 is assigned a maintenance model 22 in the model database 17. If a conformity of input data E with model sensor data M of a model data pattern 26 has been determined, the assigned maintenance model 22 can be selected for a maintenance of the machine 11. The maintenance model 22 comprises at least one maintenance step 24 and the resource 25 required for it to be carried out. Subsequently, the availability of the required resource 25 is checked and the resource 25 is requested, if available. By means of such a device 10 or such a method 20, a predicted maintenance can be carried out based on empirical knowledge contained in the maintenance models 22 of model database 17. The maintenance models 22 can be generated by means of machine learning.

LIST OF REFERENCE SIGNS 10 device
11 machine
12 input module
13 planning module 14 model module
15 resource module
16 interface module
17 model database
18 resource database
20 method
22 maintenance model
23 maintenance progress
24 maintenance step
25 resource
26 model data pattern
29 maintenance service
30 availability period
31 buffer
32 condition display
E input data
IE indicator value
IM model indicator value
M model sensor data
S sensor data
V1 first method step
V2 second method step
V3 third method step
V4 fourth method step
V5 fifth method step
V6 sixth method step
V7 seventh method step
V8 eighth method step
V9 ninth method step
V10 tenth method step
V11 eleventh method step

What is claimed is:

1. A device (10) for planning of maintenance work on a machine (11), comprising:
an input module (12) that is configured for receipt of sensor data (S) of the machine (11) and for generating input data (E) based on the sensor data (S),
a model database (17) in which multiple maintenance models (22) are stored for the maintenance work to be carried out, wherein each maintenance model (22) comprises a maintenance progress (23) with at least one maintenance step (24) and a resource (25) required for carrying out each maintenance step (24) and wherein each maintenance model (22) is linked with a model data pattern (26) comprising model sensor data (M),
a model module (14) is communicatively connected to the model database (17),
a resource database (18) in which resources (25) and their availability periods (30) are stored,
a resource module (15) that is communicatively connected to the resource database (18),
a planning module (13) that is communicatively connected with the input module (12), the model module (14), the resource module (15) and an interface module (16),
wherein the planning module (13) and/or the model module (14) is configured to carry out a comparison between the input data (E) and the model data pattern (26) and to select the maintenance model (22) assigned to the model data pattern (26) in case of determined conformity and to provide it in the planning module (13),
wherein the comparison between the input data (E) and the model data pattern (26) uses artificial intelligence algorithms for pattern recognition and/or pattern analysis in order to check whether the input data (E) and the model data pattern (26) comprising the model sensor data (M), are identical or similar,
wherein the planning module (13) and/or the resource module (15) is configured to check the availability of the resource (25) indicated in the selected maintenance model (22) and to confirm the resource availability in case of determined availability,
wherein the planning module (13) is configured to control the interface module (16) and to output the maintenance progress (23) comprising the at least one maintenance step (24) via interface module (16) to the required resource (25),
wherein the planning module (13) and/or the model module (14) is configured to correlate the input data (E) by means of a predefined correlation and to calculate an indicator value (IE) therefrom,
wherein the planning module (13) and/or the model module (14) is configured to compare the indicator value (IE) with a model indicator value (IM) assigned to the maintenance model (22) for carrying out the comparison, and,
wherein the planning module (13) and/or the model module (14) is further configured to determine a conformity between the input data (E) and the model sensor data (M), if the deviation between the indicator value (IE) and the model indicator value (IM) is less than a predefined maximum deviation.

2. The device according to claim 1, characterized in that the interface module (16) is configured to modify the maintenance progress (23) and/or the at least one maintenance step (24) output via the interface module (16) upon request of a resource (25) and to submit the modified maintenance progress (23*) to the model module (14).

3. The device according to claim 1, characterized in that the planning module (13) and/or the model module (14) is configured to correlate the model sensor data (M) of a model data pattern (26) by means of the predefined correlation and to calculate the model indicator value (1M) therefrom.

4. The device according to claim 1, characterized in that the planning module (13) is configured to request a maintenance service (29), if no model data pattern (26) has been found conforming with the input data (E).

5. The device according to claim 1, characterized in that the planning module (13) is configured to request a maintenance service (29), if the resource of a selected maintenance model (22) is not available.

6. The device according to claim 1, characterized in that the planning module (13) is configured to cause a check whether another conforming model data pattern (26) is available, if the resource (25) to a maintenance model (22) selected previously is not available.

7. The device according to claim 1, characterized in that the input module (12) is configured to compare the sensor data (S) and/or the input data (E) with at least one predefined criteria and to initiate a measure depending on the comparison result.

8. The device according to claim 7, characterized in that the input module (12) is configured to output a warning, if the sensor data (S) and/or the input data (E) fulfill a warning criteria.

9. The device according to claim 7, characterized in that the input module (12) is configured to cause an emergency stop of the machine (11), if the sensor data (S) and/or the input data (E) fulfill an emergency stop criteria.

10. The device according to claim 1, characterized in that the input module (12) is configured to select and/or pre-process the sensor data (S) based on the actual condition of the control of the machine (11) in order to generate the input data (E), wherein the control of the process of the machine (11) is known to the input module (12) and is considered for selection of sensor data for generating the input data (E).

11. A method for planning of maintenance work with the device (10) according to claim 1 on at least one machine (11) comprising the following steps:

receiving sensor data (S) of the machine (11) and providing input data (E) based on the sensor data (S), providing multiple maintenance models (22) for maintenance work to be carried out, wherein each maintenance model (22) comprises a maintenance progress (23) having at least one maintenance step (24) and the resource (25) required for each maintenance step (24) and wherein each maintenance model (22) is linked with a model data pattern (26) comprising model sensor data (M), checking whether a conformity exists between the input data (E) and one of the model data patterns (26) and selecting the maintenance model (22) assigned to the model data pattern (26) in case of a determined conformity, checking of availability of the resource (25) required in the selected maintenance model (22) and acknowledging the availability in case of determined availability, outputting the maintenance progress (23) having the at least one maintenance step (24) to the required resource (25).

* * * * *